United States Patent
Campbell et al.

[11] Patent Number: 6,117,588
[45] Date of Patent: Sep. 12, 2000

[54] DETACHABLE BATTERY HANDLE ASSEMBLY

[75] Inventors: Kris Campbell, Poplar Grove; John E. Kopala, Elgin, both of Ill.

[73] Assignee: GNB Technologies, Inc., Mendota Heights, Minn.

[21] Appl. No.: 09/069,585

[22] Filed: Apr. 29, 1998

[51] Int. Cl.[7] ................................................ H01M 2/10
[52] U.S. Cl. ........................ 429/187; 16/423; 16/DIG. 15
[58] Field of Search ................... 429/187; 16/DIG. 15, 16/423

[56] References Cited

U.S. PATENT DOCUMENTS

| | | |
|---|---|---|
| 470,123 | 1/1892 | Harris . |
| 481,664 | 8/1892 | Engledue . |
| 1,610,200 | 12/1926 | Campbell . |
| 3,093,515 | 6/1963 | Rector ................................. 136/166 |
| 3,956,022 | 5/1976 | Fox ..................................... 136/181 |
| 4,029,248 | 6/1977 | Lee ..................................... 224/45 F |
| 4,424,264 | 1/1984 | McGuire et al. ...................... 429/179 |
| 4,448,863 | 5/1984 | Terrell ................................. 429/178 |
| 4,632,888 | 12/1986 | Kump et al. ......................... 429/187 |
| 4,673,625 | 6/1987 | McCartney et al. .................. 429/187 |
| 4,693,949 | 9/1987 | Kellett et al. ........................ 429/178 |
| 4,752,543 | 6/1988 | Anderson et al. .................... 429/179 |
| 4,770,957 | 9/1988 | Miyagawa ............................ 429/175 |
| 4,861,687 | 8/1989 | Brantley et al. ..................... 429/187 |
| 5,232,796 | 8/1993 | Baumgartner ........................ 429/187 |
| 5,242,769 | 9/1993 | Cole et al. ........................... 429/187 |
| 5,256,502 | 10/1993 | Kump ................................. 429/150 |
| 5,278,003 | 1/1994 | Francisco ............................ 429/175 |
| 5,637,420 | 6/1997 | Jones et al. .......................... 429/187 |
| 6,022,638 | 2/2000 | Horton et al. . |

*Primary Examiner*—Maria Nuzzolillo
*Assistant Examiner*—Susy Tsang
*Attorney, Agent, or Firm*—Leydig, Voit & Mayer, Ltd.

[57] ABSTRACT

A removable battery handle and battery casing coupling structure wherein the handle is relatively rigid and includes a central portion, and two downwardly depending arms, the distal ends of the arms each including an attachment button which is supported on the inside surface of the distal end by a shaft, the button being received by a keyhole-shaped aperture in the battery casing end wall, which offers resistance as the shaft moves from the lower, larger portion to the upper, smaller portion of the aperture such that when the shaft is disposed in the upper, smaller portion, the handle is locked to the casing.

20 Claims, 4 Drawing Sheets

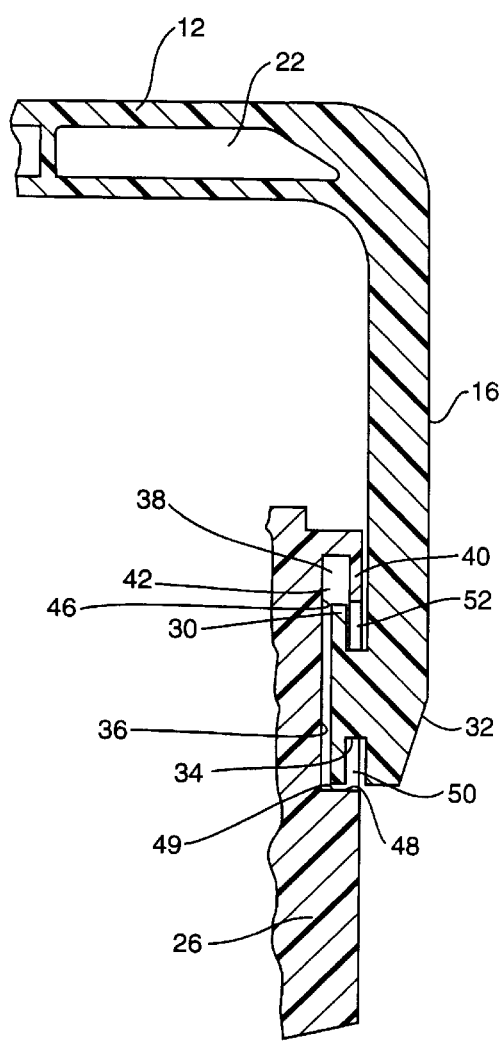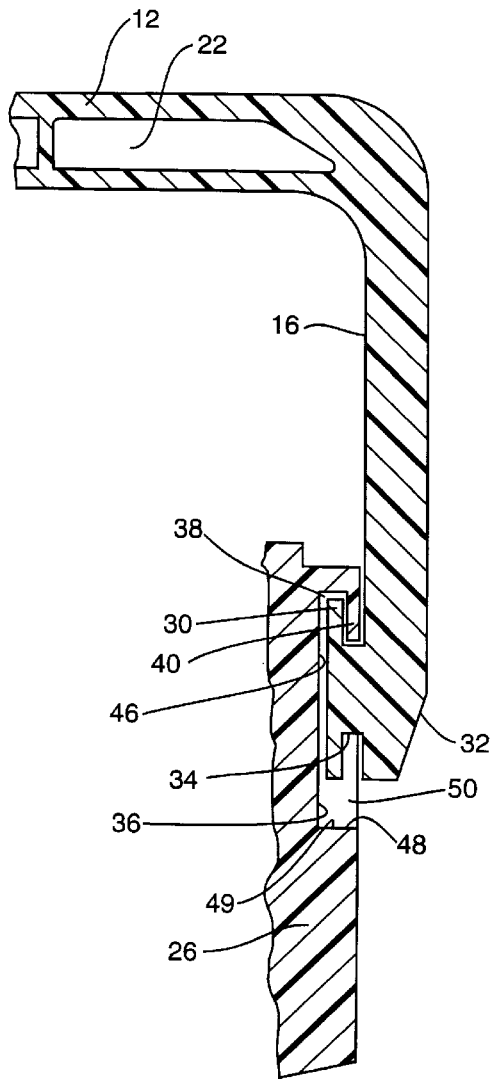
FIG. 6  FIG. 7

DETACHABLE BATTERY HANDLE ASSEMBLY

FIELD OF THE INVENTION

The invention relates to handles for carrying batteries, and more particularly to a battery carrying handle that is removably attached to the battery container.

BACKGROUND OF THE INVENTION

Starting, lighting, and ignition (SLI) batteries such are typically used in automotive, recreational, and other applications, are heavy, cumbersome, and usually require two hands for carrying. The desirability of providing such batteries with attachable/detachable handles for facilitating carrying, placement, and retrieval of such batteries has long been known. Such handles are a particular convenience in batteries designed for use in boats or in uninterrupted power supply (UPS) applications which must be frequently moved for storage, service, or recharging.

Bail-type handles, which are known in the art, typically comprise a U- or C-shaped member attached to opposing sides of a battery casing, either on its container or cover. With such handles, the battery may be carried in much the same fashion as a picnic basket or bail.

Rope-type handles typically have three injection molded plastic parts coupled by flexible rope sections and, accordingly, are physically highly flexible. The injection molded ends of the handle fit into slots on the battery. Installation of this type of handle may be difficult, however, inasmuch as the rope provides no support, the ends of the handle must be guided in by hand. Although this requirement may sound trivial, the process is so time consuming and labor intensive that most installers choose not to use the handle. Further, in some cabinet designs, the handle cannot be removed once the battery is in place without a separate tool because there is no room for the installers hand between the batteries.

Substantially rigid bail-type handles are likewise known in the art. A variety of handle designs have been proposed for carrying batteries. Detachable, substantially rigid bail handles are disclosed, for example, in U.S. Pat. No. 3,093,515 to Rector, U.S. Pat. No. 3,956,022 to Fox, U.S. Pat. No. 4,029,248 to Lee, U.S. Pat. No. 4,673,625 to McCartney et al, U.S. Pat. No. 5,242,769 to Cole et al., and U.S. Pat. No. 5,256,502 to Kump.

Frequently, the means for detachably connecting the ends of the bail handle to the battery casing comprise members which project from the overall geometry of the casing, even when the handle is detached. The McCartney et al. '625 patent, the Baumgartner '796 patent, and the Cole '769 patent, for example, disclose battery casings including such projections. These attachment points can interfere with one or more of the many types of devices by which batteries are mounted. As a result, bail handles can make it more difficult to design a battery which is suitable for use with all types of mounting devices.

Further, when the handles of many prior art designs are removed, the absence of the handle is conspicuous and the overall aesthetic appeal of the battery may be diminished. For example, when the handle of the McCartney et al. '625 patent is removed, the knob 14 continues to protrude from the side wall of the container. Not only does this present an odd appearance, the knob may catch on outside surfaces. A neat and clean design, however, may convey to the consumer a sense of quality which may be transferred to the functional performance of the battery as well. This sense may be difficult to create if many conventional designs were to be sold without a handle.

Moreover, despite the general advantages of having battery carrying handles, battery handles necessarily add cost to the battery. Institutional customers, such as those who use batteries in UPS applications, may not need a handle for each battery and, because they tend to have established maintenance procedures, may be satisfied with a single handle for use in handling many batteries.

Prior art handles, however, are often not susceptible to easy attachment and detachment. Detachment and attachment may require relatively precise alignment of cooperating parts and/or multiple motions. This may make them less than ideally suited for using a single handle. Further, in some cabinet or display designs, there is no room between the batteries for the installer's hand. As a result, some handles may not be removed once the battery is in place without a separate tool. This is particularly a problem in the case of rope-type handles because they offer no rigidity.

OBJECTS OF THE INVENTION

It is a primary object of the invention to provide a handle for a battery that a user can readily engage and disengage from a battery casing. It is a more specific object of the invention to provide a battery handle and casing coupling that may be engaged and disengaged, even when the battery is disposed in a close environment, and the user cannot physically move his/her hand along the side of the battery.

It is a related object of the invention to provide a battery handle and coupling structure on the battery casing that does not require a separate tool for engaging or disengaging the handle and the casing.

A further object of the invention is to provide a battery casing design which is suitable for use with many mounting devices. More specifically, it is an object of the invention to provide a battery casing design wherein the coupling structure does not interfere with the device by which the battery is to be mounted.

Another object of the invention is to provide a battery casing and handle which are aesthetically appealing and do not detract from the overall battery appearance, whether or not the handle is attached.

An additional object of the invention is to provide a battery handle which is durable and reusable.

It is also an object of the invention to provide a battery handle and a coupling structure in the battery casing that is versatile and may be readily used in many spacial environments.

Yet another object of the invention is to provide a battery handle that is economical to manufacture and use.

These and other objects and advantages of the invention will be apparent to those skilled in the art upon reading the following summary and detailed description and upon reference to the drawings.

SUMMARY OF THE INVENTION

In accomplishing these and other objects of the invention, there is provided a relatively rigid plastic battery handle and a coupling or receiving structure on the battery casing. The battery handle includes a central portion by which the user may grasp the handle, and two downwardly depending arms, the distal ends of which may be disposed along the sides of the battery casing. The distal ends of each of the handle arms are provided with a protrusion in the form of an enlarged attachment button supported on the arm by a shaft. The battery casing comprises a keyhole-shaped aperture which opens into a recess and receiving chamber. The lower, larger portion of the keyhole-shaped aperture is sufficiently large to receive the attachment button, while the upper, smaller portion of the keyhole-shaped aperture is smaller than the attachment button, but large enough to receive the shaft. According to an important feature of the invention, the width of the aperture at the transition between the larger and smaller portions of the keyhole-shaped aperture is slightly smaller than the diameter, or width, of the shaft such that it presents an interference to the free movement of the shaft between the larger and smaller portions.

When it is desired to place the handle on the battery casing, the arms of the handle are moved apart from each other slightly, by arching either the central portion of the handle or the arms themselves. The distal ends of the arms are then placed along the ends of the battery casing and positioned so that the attachment buttons at the distal ends of the arms are disposed adjacent the larger portion of the keyhole-shaped aperture, the buttons advancing into the aperture as the handle returns to its original shape.

As the user exerts an upward, lifting force on the handle, the shafts move upward within the keyhole-shaped apertures. When the upward lifting force and the weight of the battery overcome the resistance force of the interference points in the apertures, the shafts move up into the smaller portions of the apertures, and the attachment buttons into respective receiving chambers disposed subjacent the small portions of the apertures. As the interference points resume below the shafts, the interference points prevent the shafts from moving downward within the keyhole-shaped apertures, even when the battery is placed on a shelf or the like and the lifting force is removed. Thus, the handle remains coupled to the battery casing until removed by the user.

The handle may be easily disengaged from the casing by merely tapping or hitting the central portion of the handle to apply a downward force along the longitudinal axis of each of the arms. This downward force must be sufficient to overcome the resistance force asserted by the interference points in the apertures and move the shafts downward into the lower, larger portions of the apertures. The distal ends of the arms may then be moved apart from one another to remove the attachment buttons from the recesses in the battery casing, and the handle then removed from the casing.

In view of the substantially rigid structure of the handle and the unique structures of the distal ends of the handle and the receiving structure in the casing, the user is not required to physically contact the distal ends of the handle or the casing when either engaging or disengaging the handle from the casing. As a result, the handle may be engaged or disengaged even when the battery is disposed in relatively close quarters. The user's hand need not directly move between the battery casing and adjacent structures. Further, no special tools are required for attachment or detachment of the handle, even when the battery is placed in a tight location.

Preferably, the handle is rotatable when engaged with the casing in order to provide maximum flexibility in handling and placement of the battery. This rotatability is preferably accomplished by the shaft being round and the upper, smaller portion of the aperture presenting the arc of a circle. An arc of greater than 180° may likewise provide the points of interference to resist vertical movement of the shaft.

Further, because the coupling structure on the battery casing is in the form of a recess, the casing may be designed to present minimal or no protrusions from the end walls of the casing. As a result, the handle coupling structure on the battery casing will not interfere with mounting devices used for securing the battery in an application. Additionally, the battery casing provides a clean, aesthetically pleasing appearance which may enhance the user's perception of battery quality.

The battery handle is preferably made of a thermoplastic material, it is durable and reusable. Also, the handle may be economically manufactured inasmuch as it may be injection molded in a multiple cavity two-piece mold having no movable cores. The handle is likewise economical to use inasmuch as it requires minimal labor to engage and disengage from the battery casing.

DESCRIPTION OF THE DRAWINGS

FIG. 6 is an enlarged fragmentary cross-sectional view of the battery handle and battery casing showing the attachment button at the distal end of the handle disposed in the recess in the unlocked position.

FIG. 7 is an enlarged fragmentary cross-sectional view of the battery handle and container, similar to that shown in FIG. 6, with the handle in the locked, carrying position.

DETAILED DESCRIPTION OF THE INVENTION

Figure 1:
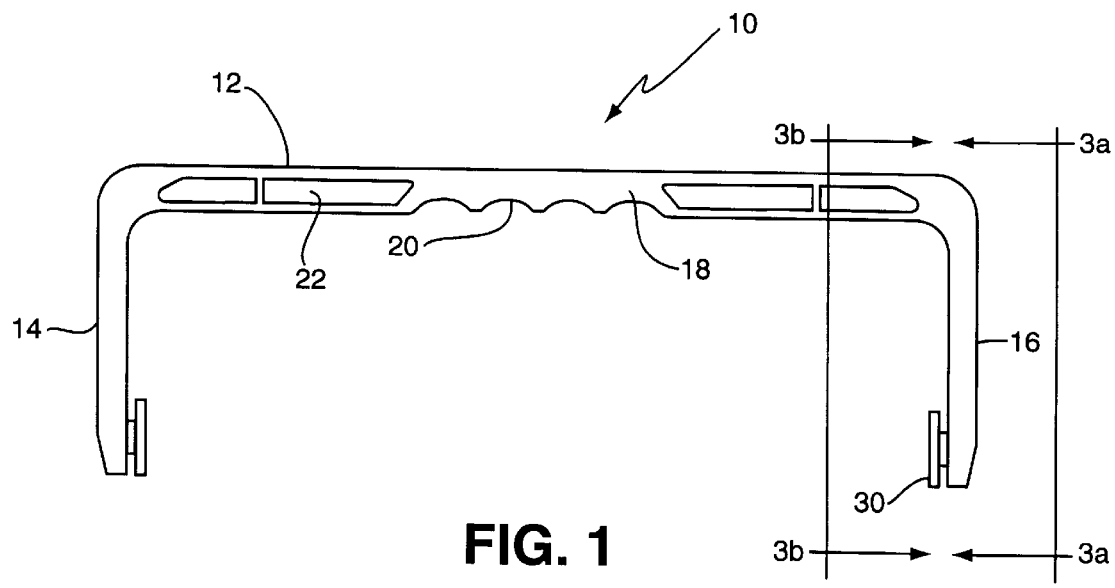
FIG. 1 is a side plan view of a battery handle constructed in accordance with teachings of the invention.

Turning now to the drawings, there is shown in FIG. 1 a bail-type handle 10 constructed in accordance with teachings of the invention. In general, the handle 10 comprises a central portion 12 and two downwardly depending arms 14, 16. If desired, the central portion 12 may be formed with a gripping portion 18 to assist in transporting the battery. As shown in FIG. 1, the gripping portion 18 may include indentations 20 for receiving the user's fingers in order to provide the user with a more comfortable grip. Additionally, the central portion 12 of the handle 10 may include recessed portions 22 which minimize the amount of plastic material necessary to mold the handle.

Figure 2:
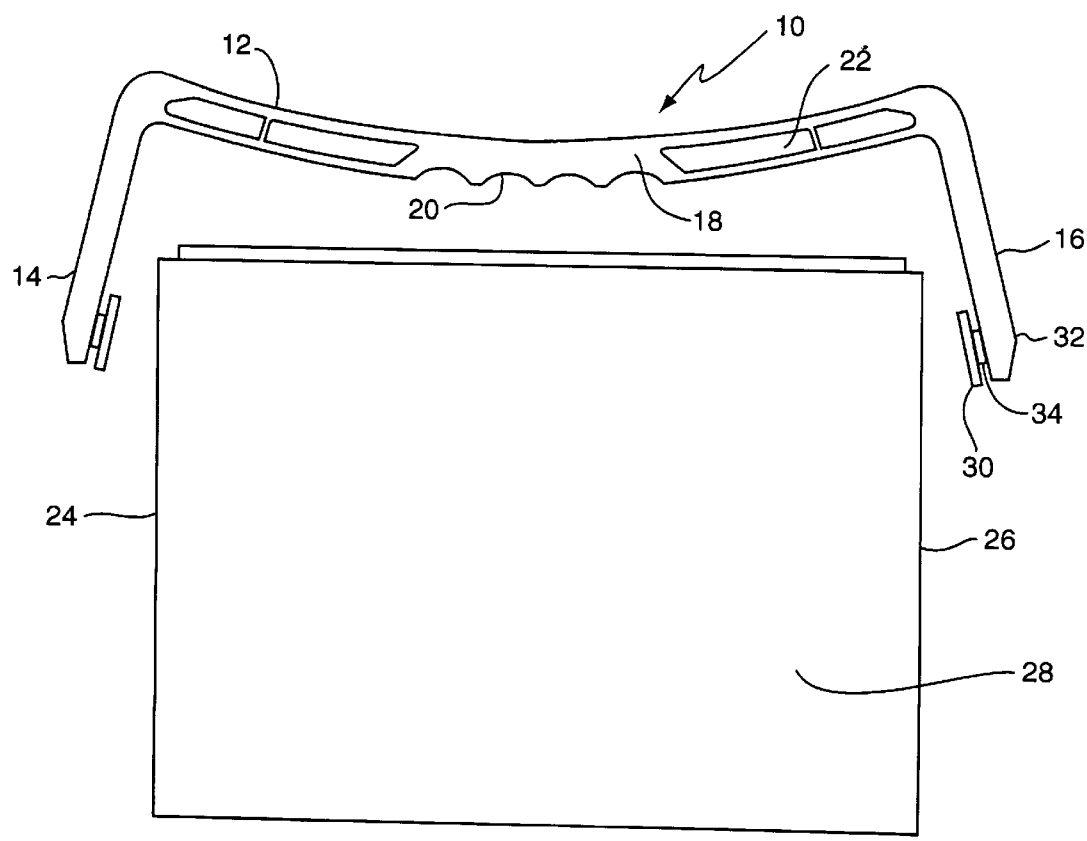
FIG. 2 is a side plan view of the handle of FIG. 1 arched to illustrate the method by which the handle may be assembled to a battery casing.
Figure 3A:
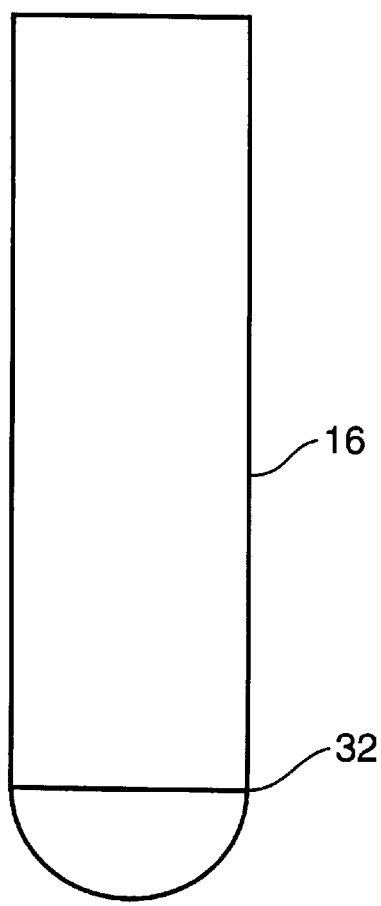
FIG. 3A is an enlarged end view of the handle taken along sightline 3A—3A of FIG. 1.
Figure 3B:
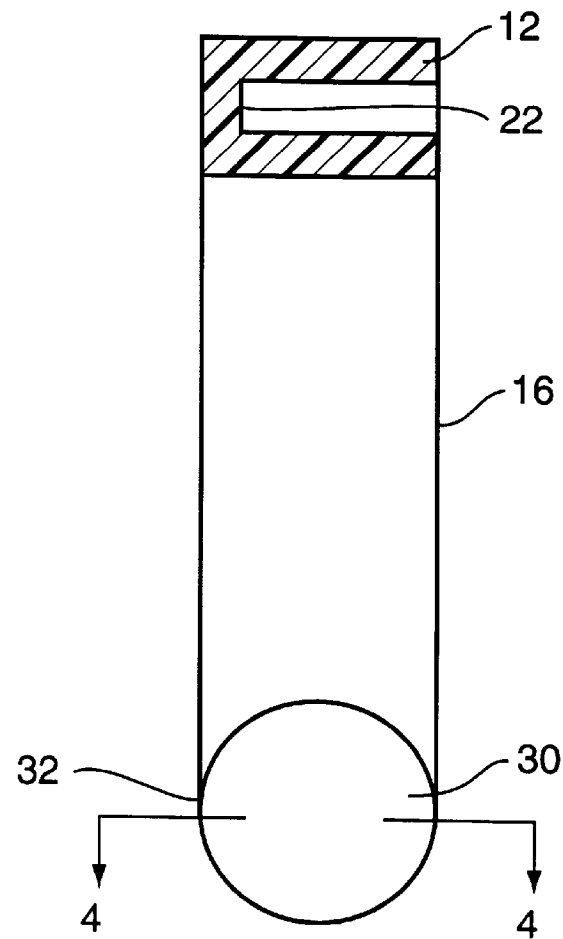
FIG. 3B is an enlarged cross-sectional view of the handle taken along line 3B—3B of FIG. 1.
Figure 4:
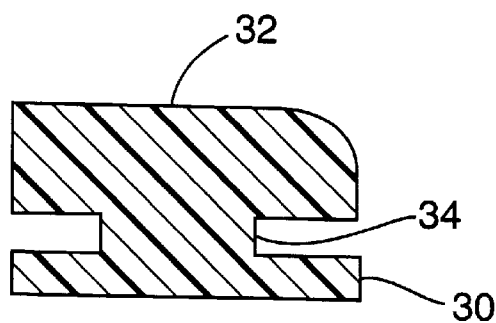
FIG. 4 is a further enlarged cross-section view of the handle taken along line 4—4 in FIG. 3B.
Figure 5B:
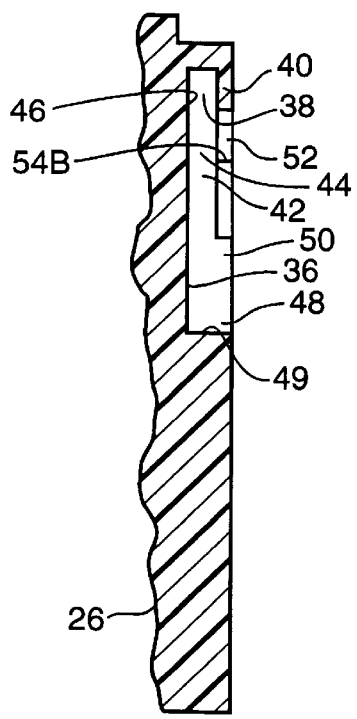
FIG. 5B is a fragmentary cross-sectional view taken long line 5B—5B in FIG. 5A.
Figure 5A:
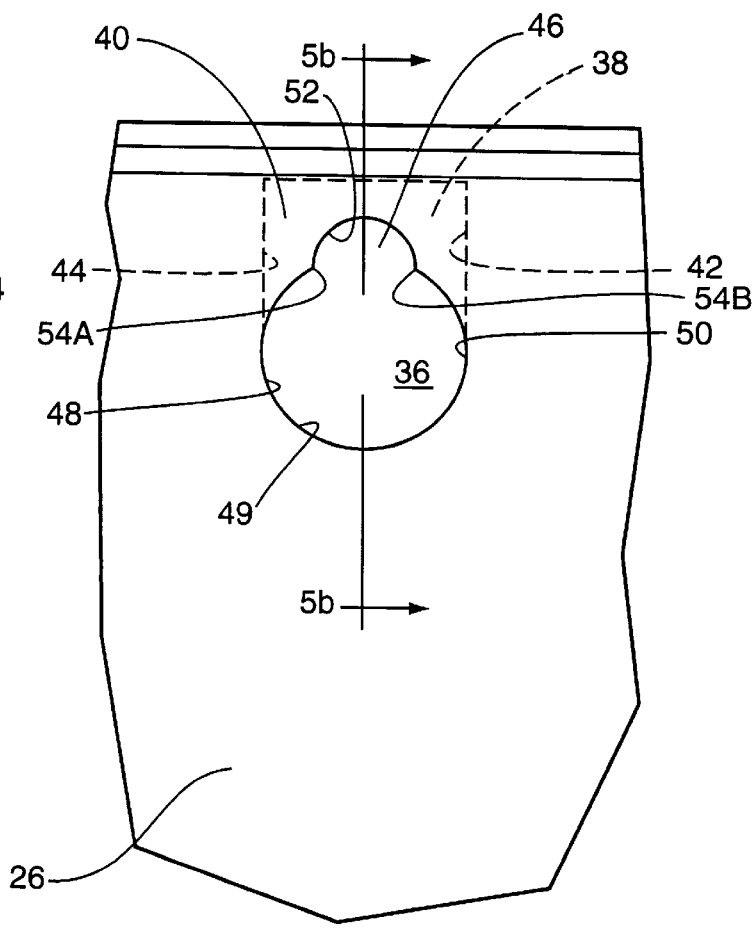
FIG. 5A is an enlarged fragmentary end view of a battery casing constructed in accordance with teachings the invention and comprising a recess for receiving a distal portion of the handle.

In accordance with the invention, the handle 10 is a resilient, substantially rigid, unitarily molded, plastic element which is sufficiently elastically deformable to allow the user to spread the arms 14, 16 apart from one another, as shown, for example, in FIG. 2. The handle 10, however, is likewise sufficiently rigid to permit the user to advance the arms 14, 16 along the outside walls 24, 26 of the battery housing or casing 28 and into cooperation with the receiving structure in the battery casing walls 24, 26, even when the batteries are closely stacked. The handle is preferably molded from a thermoset plastic material such as polypropylene.

According to an important feature of the invention, the distal ends 32 of the arms 14, 16 comprise a coupling structure in the form of an attachment button 30 coupled to the distal end 32 of the arm 16 by a shaft 34. (As arm 14 is the mirror image of arm 16, only arm 16 will be described further in detail.) When assembled to the battery casing 28, the attachment button 30 is received by recess 36 in the battery casing 28, as shown in FIGS. 6 and 7. While the recess may be provided in either the battery container or lid, it is provided in the container in the illustrated preferred embodiment. As may be seen in FIGS. 2, 5A, 5B, 6, and 7, the battery casing 28 requires no protrusions for mating with the handle 10. As a result, the attachment points present no interference with mounting devices used to couple a battery in a particular application. Likewise, the battery casing 28 provides an appealing aesthetic appearance to the consumer.

In order to receive the attachment button 30 and to facilitate coupling the handle 10 to the container wall 26 or other portion of the casing, a substantially keyhole-shaped aperture 48 is provided. The keyhole-shaped aperture is defined by a lower arcuate wall 49 and an exterior downwardly depending wall 40. As may best be seen in FIG. 5A, the lower portion 50 of the keyhole-shaped aperture 48 is sufficiently large to receive the attachment button 30 into the recess 36, as shown in FIG. 6. Preferably, the attachment button 30 and/or the lower portion 50 of the keyhole-shaped aperture 48 are round in order to eliminate the need for the handle 10 to be disposed at a defined angle to the battery casing 28 for proper insertion. When disposed in this position, the handle 10 is not locked to the battery casing 28.

In order to facilitate locking the handle 10 to the battery casing 28, the upper portion 52 of the keyhole-shaped aperture 48 is smaller than the lower portion 50, and is sized to receive the shaft 34, which supports the attachment button 30. To receive the attachment button 30 when the shaft 34 is disposed within the upper portion 52 of the aperture 48, the recess 36 is provided with a receiving chamber 38. The receiving chamber 38 is subjacent the upper portion 52 of the aperture 48, and is defined by the exterior downwardly depending wall 40, side downwardly depending walls 42, 44 and battery casing surface 46. In this way, when the shaft 34 moves upward within the aperture 48, the button is received within the chamber 38 as shown in FIG. 7.

Preferably, both the upper portion 52 of the keyhole-shaped aperture 48 and the shaft 34 are round, such that the shaft 34 may readily rotate within the upper portion 52 of the aperture 48. The upper portion 52 may have an alternate geometry so long as it permits the handle 10 to rotate. It will be appreciated by those skilled in the art that this rotation provides the user with additional flexibility and carrying, moving, and placing the battery. In order for the handle 10 to rotate relative to the battery casing 28 when the attachment button 30 and shaft 34 are disposed in the position shown in FIG. 7, the relative size and geometry of the attachment button 30 and the receiving chamber 38 must be such that the button 30 may freely rotate with the handle 10. Preferably, the length of the arms 14, 16 is selected such that the central portion 12 of the handle 10 will conveniently rest alongside the container when the handle 10 is rotated to one side in the event that the user chooses to keep the handle 10 on the battery once it is on a shelf or placed into the service position after installation.

According to an important feature of the invention, the shaft 34 is held in position in the upper portion 52 of the keyhole-shaped aperture 48 to prevent its disengagement therefrom by the force of gravity on the handle 10. This is accomplished by means of an interference as the shaft 34 passes between the lower portion 50 and the upper portion 52 of the keyhole-shaped aperture 48. In the illustrated design, this interference is created by points 54A and 54B shown most clearly in FIGS. 5A and 5B. It will be appreciated by those skilled in the art that these interference points 54A, 54B are created when the upper portion 52 of the keyhole-shaped aperture 48 has an arcuate shape greater than 180°. It has been determined that an arc on the order of 195° is sufficient to provide the necessary interference. Once the shaft 34 moves past these interference points 54A, 54B, the handle 10 will be held in place until dislodged by the user.

In summary, in order to carry the battery 28, a user moves the distal ends of the arms 14, 16 apart from one another. This may be accomplished by arching the central portion 12 of the handle 10, as shown in FIG. 2, or, alternately, by flexing the arms 14, 16 themselves apart from one another. The handle 10 is then positioned around the walls 24, 26 of the battery 28, and allowed to return to its original shape, positioning the attachment buttons 30 in the lower portion 50 of the keyhole-shaped aperture 48, as shown in FIG. 6.

The battery 28 may then be lifted using the handle 10. As shown in FIG. 7, the weight of the battery 28 will cause the attachment button 30 supported by the shaft 34 to move upward within the recess 36. As the button 30 and shaft 34 move upward, the force exerted due to the mass of the battery 28 is greater than the resistance to movement of the shaft 34 offered by the interference points 54A, 54B. As a result, the shaft 34 moves into the upper portion 52 of the keyhole-shaped aperture 48 and the attachment button 30 into the receiving chamber 38, as shown in FIG. 7. Once in this position, the interference offered by points 54A, 54B is sufficient to maintain the handle in position with the shaft 34 in the upper portion 52, even when the force due to the mass of the battery 28 is relieved, as when it is set down. Additionally, in this position, the user may pivot the handle 10 relative to the battery 28, rotating the attachment button 30 and shaft 34 within the receiving chamber 38 and upper portion 52 of the keyhole-shaped aperture 48, respectively.

Once the battery is properly placed and the user wishes to remove the handle 10 from the battery 28, the user merely applies a relatively small downward force to the handle 10, perhaps by hitting the top of the handle 10 along the central portion 12 adjacent the arms 14, 16, to overcome the force created by interference points 54A, 54B and move the shaft 34 and attachment button 30 into the lower portion 50 of the keyhole-shaped aperture 48. The user then applies a bending force to bend the arms 14, 16 away from the battery wall 26 and lift the attachment button 30 from the recess 36 and remove the handle 10 from the battery.

Thus, the inventive handle 10 and receiving structure on the battery casing permits the user to quickly attach and detach the handle 10 and offers many advantages over the prior art. For example, as compared to rope handles, inasmuch as the handle 10 is relatively rigid and may rotate while coupled to the battery casing 28, the handle 10 provides the user with great flexibility. Further, the handle may be readily injection molded in a two-part mold having no movable cores, providing low cost manufacturing. Moreover, assembly costs are minimized as it may be easily applied to and removed from the battery.

We claim:

1. An electric storage battery having a detachable handle, the battery comprising:

the handle having an elongated central portion and two arms depending from the central portion;

each arm comprising a distal end opposite the central portion, a shaft extending from the distal end, the shafts of each arm extending generally toward each other, and a button disposed on the shaft; and a battery casing having end walls;

each end wall comprising a recess, and a substantially keyhole shaped aperture opening into the recess;

the aperture comprising a lower portion, the lower portion being large enough to freely receive the button, an upper portion, the upper portion being smaller than the button, but larger than the shaft, and a restriction between the lower portion and the upper portion disposed such that the restriction prohibits free movement of the shaft between the upper and lower portions, the restriction being smaller than the width of the shaft for all rotational orientations of the shaft in the aperture.

2. The battery of claim 1 wherein the handle is formed of a rigid, yet resilient plastic such that a force may be applied to move the distal ends of the arms away from each other, the distal ends returning to substantially their original position when the force is removed.

3. The battery of claim 2 wherein the handle is molded of a thermoset plastic.

4. The battery of claim 1 wherein the upper portion is in the shape of the arc of a first circle, and the lower portion is in the shape of the arc of a second circle, the first circle being smaller than the second circle.

5. The battery of claim 1 wherein the upper portion is in the shape of the arc of a circle, and the shaft is substantially round such that when the shaft is disposed in the upper portion, the shaft may rotate to pivot the handle.

6. The battery of claim 1 wherein the upper portion is in the shape of the arc of a circle, the arc being greater than 180°, the distance between the ends of the arc being smaller than the diameter of the circle such that the ends of the arc define the restriction between the lower portion and the upper portion.

7. The battery of claim 6 wherein the shaft is substantially round such that when the shaft is disposed in the upper portion, the shaft may rotate to pivot the handle, the upper portion having a geometry that permits the handle to rotate.

8. The battery of claim 7 wherein the button is round.

9. The battery of claim 4 wherein the arc of the first circle is greater than 180°, the distance between the ends of the arc being smaller than the diameter of the first circle such that the ends of the arc define the restriction between the lower portion and the upper portion.

10. The battery of claim 9 wherein the shaft is substantially round such that when the shaft is disposed in the upper portion, the shaft may rotate to pivot the handle.

11. The battery of claim 10 wherein the button is round.

12. A method of attaching and detaching a substantially U-shaped handle to the end walls of an electric storage battery having a width, the method comprising the steps of:

moving the ends of the handle apart to a distance greater than the width of the battery;

placing the ends of the handle adjacent the substantially keyhole shaped apertures in the end walls of the battery, the keyhole shaped apertures having a larger lower portion and a smaller upper portion, each keyhole shaped aperture including a restriction between the upper and lower portions;

moving buttons supported on shafts extending from the ends of the handle into the lower portions of the apertures in the end walls of the battery, the shafts disposed in the apertures being larger than the corresponding restrictions for all rotations of the shafts in the apertures;

exerting an upward force on the U-shaped handle;

advancing the shafts supporting the buttons upward within the apertures to move the shafts into the upper portions of the keyhole shaped apertures and couple the handle to the battery.

13. The method claimed in claim 12 further comprising the steps of applying a generally downward force on the ends of handle;

moving the shafts supporting the buttons downward within the apertures into the lower portions of the keyhole shaped apertures;

moving the ends of the handle apart to a distance greater than the width of the battery; and removing the handle from the battery.

14. The method claimed in claim 12 further comprising the steps of overcoming the force of the restrictions to move the shafts from the lower portions to the upper portions, restoring the restrictions to inhibit the shafts from moving downward from the upper portion to the lower portion of the apertures.

15. The method claimed in claim 14 further comprising the steps of applying a generally downward force on the ends of handle;

overcoming the force of the restrictions to move the shafts supporting the buttons downward within the apertures into the lower portions of the keyhole shaped apertures;

moving the ends of the handle apart to a distance greater than the width of the battery; and removing the handle from the battery.

16. The method claimed in claim 12 further comprising the step of pivoting the handle to rotate the shafts within the upper portions of the apertures.

17. The method claimed in claim 14 further comprising the step of pivoting the handle to rotate the shafts within the upper portions of the apertures.

18. The method claimed in claim 12 wherein the smaller upper portion of the keyhole shaped apertures has an arcuate shape, and the step of moving buttons includes the step of moving buttons supported on substantially round shafts.

19. The method claimed in claim 14 wherein the smaller upper portion of the keyhole shaped apertures has an arcuate shape, and the step of moving buttons includes the step of moving buttons supported on substantially round shafts.

20. The method claimed in claim 15 wherein the smaller upper portion of the keyhole shaped apertures has an arcuate shape, and the step of moving buttons includes the step of moving buttons supported on substantially round shafts.

* * * * *